US006896787B2

(12) United States Patent
Yan

(10) Patent No.: US 6,896,787 B2
(45) Date of Patent: May 24, 2005

(54) METAL ARTICLES WITH SMOOTH SURFACE HAVING DURABLE VISIBLE MARKING AND METHOD OF MANUFACTURE

(75) Inventor: Peter Yan, Arcadia, CA (US)

(73) Assignee: Jas. D. Easton, Inc., Van Nuys, CA (US)

( * ) Notice: Subject to any disclaimer, the term of this patent is extended or adjusted under 35 U.S.C. 154(b) by 299 days.

(21) Appl. No.: 10/243,892

(22) Filed: Sep. 13, 2002

(65) Prior Publication Data

US 2004/0050710 A1 Mar. 18, 2004

(51) Int. Cl.[7] .......................... C25D 11/04; B32B 15/04

(52) U.S. Cl. ....................... 205/324; 205/325; 205/328; 205/687; 427/331; 427/444; 428/687; 428/457; 428/927

(58) Field of Search ................................ 205/324, 325, 205/328, 687; 427/331, 444; 428/687, 457, 927

(56) References Cited

U.S. PATENT DOCUMENTS 4,201,821 A * 5/1980 Fromson et al. ............ 428/457

* cited by examiner

*Primary Examiner*—Robert R. Koehler
(74) *Attorney, Agent, or Firm*—Roth & Goldman, P.A.

(57) ABSTRACT

Metal articles having a durable visible marking on a smooth Type III hard anodized surface particularly useful for shock absorber tubes are produced by applying an alkaline solution to the anodized surface for not less than about 15 seconds at temperature of 100°–140° F.; applying a pattern of lacquer based solvent ink to said surface; and sealing the applied pattern by applying a liquid selected from the group consisting of nickel acetate, cobalt acetate and boiling water to said pattern.

17 Claims, 1 Drawing Sheet

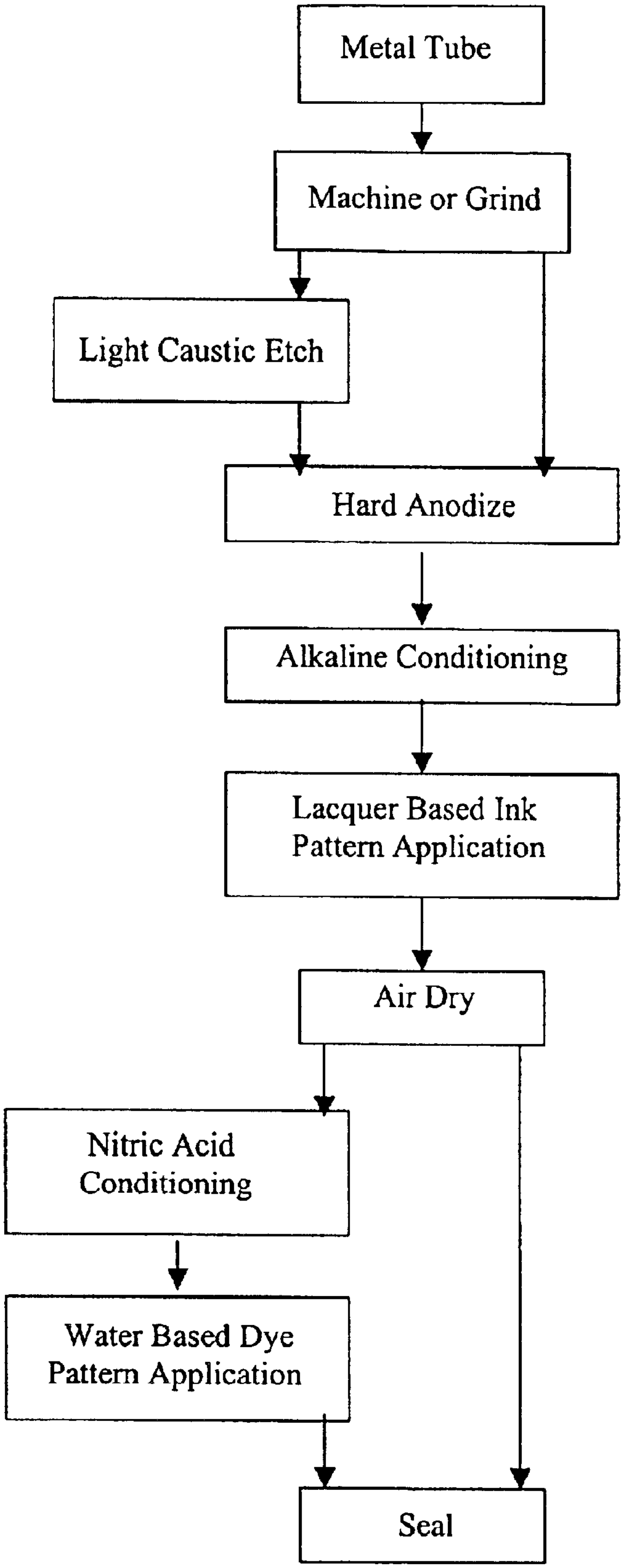
Metal Tube
Machine or Grind
Light Caustic Etch
Hard Anodize
Alkaline Conditioning
Lacquer Based Ink Pattern Application
Air Dry
Nitric Acid Conditioning
Water Based Dye Pattern Application
Seal

METAL ARTICLES WITH SMOOTH SURFACE HAVING DURABLE VISIBLE MARKING AND METHOD OF MANUFACTURE

FIELD OF THE INVENTION

The present invention relates to the production of metal articles such as high strength lightweight tubes which are particularly useful for adjustable shock absorbers for cycles such as off road or mountain bikes, and the application of durable visible surface patterns to the metal articles. Such patterns may comprise shock position marks or graduations of various colors to selected areas of an anodized surface of the tube. Metal articles of aluminum and alloys thereof having a smooth anodized surface with visible long wearing markings thereon such as shock absorber position marks or graduations are provided.

BACKGROUND OF PRIOR ART

Anodized surfaces of metal products made of metals including aluminum, zinc, magnesium and titanium and alloys thereof have been marked and decorated for many years by dyeing and sealing selected areas of the anodized surface. Conventionally decorated soft anodized surfaces are not sufficiently durable and are therefore not favored for inner shock absorber tubes and other uses in which the anodized surface is subjected to frictional sliding contact with bearings, bushings and the like since the outer wear surface of the tube must be very smooth and the application of shock position markings thereto by conventional techniques such as application of decals or labels, and ink printing results in slightly raised marking surfaces on the tube which rapidly wear off as do other non-permanent patterns such as decals and surface markings provided by other techniques. Also, it is known that various colors and dyes applied to anodized surfaces may fade or discolor, particularly when used outdoors.

Since high strength and low weight are particularly important in many applications such as tubular metal cycle frames and parts, the hard high strength 7000 Series aluminum alloys are preferred over softer alloys such as the 2000, 5000 or 6000 Series aluminum alloys.

Metal articles having a hard anodized surface with a smooth surface pattern comprised of durable visible markings of contrasting color are therefore desired.

SUMMARY OF THE INVENTION

The present invention therefore provides a method of producing a metal article having a durable visible marking and smooth surface comprising the steps of:

a) applying an alkaline solution to a Type III hard anodized surface of a metal article for not less than about 15 seconds at temperature of 100°–140° F. to open pores in said hard anodized surface;

b) applying a pattern of lacquer based solvent ink to said surface;

c) allowing said pattern to dry; and d) sealing said pattern by applying a liquid selected from the group consisting of: nickel acetate, cobalt acetate and boiling water to said pattern.

BRIEF DESCRIPTION OF THE DRAWING

The sole FIGURE provided is a flow diagram showing process steps used to produce a metal tube with a hard anodized surface having visible markings thereon.

DETAILED DESCRIPTION

Although the invention will be described with reference to the manufacture of inner tubes of adjustable shock absorbers provided with externally visible surface markings for indicating the set position of the adjustable shock absorber, the invention is not limited in its broadest aspects to shock absorber tubes as will be apparent.

Straight stock aluminum tubes, preferably of 7000 Series aluminum alloy, are prepared for anodizing by machining, grinding, buffing or chemical polishing the outer surface of the tube as necessary to a surface roughness in the range of 10–30 Ra. Any residue remaining on the surface of the tubes is then thoroughly removed by cleaning with soap and water and rinsing or by lightly etching the tubes in a caustic solution to remove oxides to produce the desired uniform finish.

A hard anodized surface is then provided on all or selected areas of each metal article, in this case on the exterior surface of the metal tube, by immersion of the tube in an electrolyte containing from 10–30% by weight of sulphuric acid at a temperature in a range of 28°–50° F., preferably 40° F., and using an anodizing current density of 15–50 amperes per square foot for not less than about 15 minutes. This produces a Type III (Mil Spec.—A-8625C) hard anodized surface having a thickness in a range of about 0.0005" to 0.004" or more depending on the concentration of sulphuric acid and the other parameters previously referred to. Preferably, the anodized surface is provided by conducting the process at about 40° F. or higher since this has been found to create larger pore size in the anodized surface, the pores in turn thus being more receptive to coloration in steps to be subsequently described.

Following the hard anodization of the surface areas of the article, the article, or at least the hard anodized surface area thereof to be marked, is contacted with an alkaline solution, preferably by immersion therein, for not less than about 15 seconds at a temperature in the range of 100°–140° F. to enlarge and open the pores created during the hard anodization process. The alkaline solution may comprise a sodium carbonate solution having a concentration in the range of about 1–4 oz/gal. The Type III hard anodized surface is now ready for application of markings or a pattern which, for example, may comprise a scale of visible graduations useful for ascertaining the position of adjusted length of a shock absorber tube.

Various processes such as silk screening, pad printing, sublimation printing or inkjet printing may be used to apply a lacquer based solvent ink to selected areas of the hard anodized surface as desired. The lacquer base ink is preferably comprised of a low molecular weight vinyl or acrylic resin containing one or more dissolved dyes which have significant resistance to fading in daylight. Conventionally used nitrocellulose lacquers are not suitable for this application due to poor resistance to fading. High molecular weight resins of molecular size larger than about 100 Å (Angstroms) do not adequately penetrate the pores in an anodized surface and therefore inadequately carry coloration thereto. Other colorants may be suspended in the ink if desired to provide additional color or other effects such as fluorescence and phosphorescence. The lacquer based ink may be opaque, somewhat transparent or clear if it is desired that the lacquer based ink be used merely to mask areas not intended to be colored. The lacquer based ink is then allowed to dry in ambient or heated air.

Water soluble dye of the desired color may be additionally used to apply coloration to selected areas to enhance the appearance and functionality of the finished article. For this purpose the remaining open pores in the pattern to which lacquer based ink has not previously been applied may be subjected to an acid treatment to enhance water based dye absorption as will be described.

If all portions of the applied lacquer based ink are clear to mask desired areas, additional steps are required to apply a visible colored pattern to the unmasked areas. A second application of lacquer based ink comprising a different color may be applied to the unmasked areas by various processes such as silk screening, pad printing, sublimation printing and inkjet printing. Alternatively, the unmasked areas can be dyed with a water soluble ink. In the latter instance, the area of the surface to which the water soluble dye is to be applied, including the area masked by the clear lacquer based ink, may be subjected, as by immersion, to a nitric acid solution for about 15 seconds to 2 minutes to acidify the pores in the unmasked portions of the pattern. The nitric acid does not attack the previously applied lacquer based ink but serves to remove any foreign matter such as fingerprints or atmospheric moisture or other deposits which may be present. The unmasked and acidified areas of the surface may then be dyed with a colored water soluble dye which can be applied by immersing the article in water soluble dye at a temperature of 90–150° F. for about 1–10 minutes or by hand rubbing the surface with a dye saturated cloth or sponge so that the water soluble dye enters and adheres to the acidified walls of the pores of the hard anodized surface. Preferably the nitric acid solution used to treat the anodized surface is an aqueous solution containing about 5–20% nitric acid maintained at a temperature between 60°–100° F.

After complete application of the desired pattern of lacquer based ink and optionally, the water soluble dye, the marked pattern on the anodized surface is finally sealed. This may be done by immersing the article in a nickel or cobalt containing solution such as a dilute solution of nickel or cobalt acetate having a concentration of about 1 oz./gal. at a temperature of about 200° F. for about 5 minutes. The pattern may be sealed by applying a solution of nickel acetate to the pattern at a temperature in the range of 180°–210° F. for about 2–15 minutes. The nickel acetate solution preferably has a concentration of nickel acetate about 0.5–2.0 oz./gal. and pH of 5.2–5.5 and the pattern is immersed in the solution. When the sealing step comprises immersion in a nickel or cobalt acetate solution, nickel or cobalt hydroxide is precipitated at the openings of the colored pores forming plugs which prevent leaching of the applied color. The sealing process in hot nickel or cobalt acetate or in hot water also hydrates any exposed anodized metal oxide walls of the surface pores and results in volume expansion thus reducing the pore size and assisting to create a more smooth surface. Alternatively, the surface can be heat sealed by immersion of the article in boiling de-ionized water for about 5–20 minutes or in resin solutions which impregnate the pores to provide the desired sealing.

Finally, any remaining excess ink or dye may be removed by mechanical wiping or solvent cleaning to result in a finished article such as a bicycle shock absorber tube, or other article as desired, having a smooth Type III hard anodized surface with durable visible markings thereon.

The ink and dye may be applied to the hard anodized surface of the article in the marked areas to be colored in any suitable fashion such as by wiping of the ink or dye onto the article with a felt pad, cotton rag, sponge, or any suitable absorbent applicator impregnated or wetted with the ink may be used. Alternatively, the ink and dye may be applied by immersing the marked areas of the article in an ink or dye bath or by spraying the ink or dye onto the exposed (unsealed) area of the article. The concentration of dye dissolved in the lacquer based ink, and, optionally, other colorants such as suspended pigment particles which may also be included in the lacquer based ink, and the viscosity of the lacquer based ink can be adjusted as necessary to produce the desired color, transparency, shade and aesthetic result.

Persons skilled in the art will understand that various modifications can be made to the invention described above and that the scope of protection is defined by the wording of the claims which follow.

What is claimed is:

1. A method of producing a metal article having a durable visible marking and smooth surface comprising the steps of:

a) applying an alkaline solution to a Type III hard anodized surface of a metal article for not less than about 15 seconds at temperature of 100°–140° F. to open pores in said hard anodized surface;

b) applying a pattern of lacquer based solvent ink to said surface;

c) allowing said pattern to dry; and d) sealing said pattern by applying a liquid selected from the group consisting of: nickel acetate, cobalt acetate and boiling water to said pattern.

2. The method of claim 1, including producing said hard anodized Type III surface to a thickness of from 0.0005" to 0.004" by immersing said article in an electrolyte containing 10–30% w of sulphuric acid, at a temperature in the range of 28°–50° F., at a current density of 15–50 A/sq. ft. for not less than about 15 minutes.

3. The method of claim 2, wherein said article is 7000 Series aluminum alloy and said anodization temperature is about 40° F. or above.

4. The method of claim 3, wherein said anodized surface is immersed said alkaline solution comprising a sodium carbonate solution having a concentration in the range of about 1–4 oz/gal. for not less than about 15 seconds at temperature in the range of 100°–140° F.

5. The method of claim 4, wherein said pattern is applied by screen printing a colored lacquer based ink comprising a low molecular weight vinyl or acrylic resin and dissolved dye into said anodized surface.

6. The method of claim 4, wherein said pattern is applied by screen printing a clear lacquer based ink onto selected areas of said anodized surface to mask said selected areas, then immersing said pattern in a nitric acid solution for about 15 seconds to 2 minutes to acidify open pores in said hard anodized surface, and dyeing unmasked areas of said pattern with a colored water soluble dye prior to said sealing.

7. The method of claim 6, wherein said nitric acid solution comprises an aqueous solution containing about 5–20% nitric acid.

8. The method of claim 6, wherein said water soluble dye is applied by immersing said pattern in said water soluble dye at a temperature in the range of 90°–150° F. for about 1–10 minutes.

9. The method of claim 1, wherein said pattern is sealed by applying a solution of nickel acetate to said pattern at a temperature in the range of 180°–210° F. for about 2–15 minutes.

10. The method of claim 9, wherein said nickel acetate solution has a concentration of nickel acetate about 0.5–2.0 oz./gal. and pH of 5.2–5.5 and said pattern is immersed in said solution.

11. The method of claim 1, wherein said pattern is sealed by immersing said pattern in boiling water for about 5–20 minutes.

12. The method of claim 8, wherein said pattern is sealed by applying a solution of nickel acetate to said pattern.

13. The method of claim 12, wherein said nickel acetate solution has a concentration of nickel acetate about 0.5–2.0 oz./gal. and pH of 5.2–5.5 and said pattern is immersed in said solution.

14. The method of claim 8, wherein said pattern is sealed by immersing said pattern in boiling water for about 5–20 minutes.

15. A metal article comprising a 7000 Series aluminum alloy having a smooth Type III hard anodized surface with a durable visible pattern of lacquer based solvent ink in pores of said anodized surface produced by the method of claim 1.

16. The article of claim 15, comprising an aluminum alloy tube wherein said pattern is on an exterior anodized surface of said tube.

17. The article of claim 16, wherein said tube is an inner tube of an adjustable shock absorber and said pattern is a shock absorber extension determination scale.

* * * * *